US 011040404B2

(12) United States Patent
Matsuda et al.

(10) Patent No.: US 11,040,404 B2
(45) Date of Patent: Jun. 22, 2021

(54) CUTTING INSERT AND BORING TOOL

(71) Applicants: SUMITOMO ELECTRIC HARDMETAL CORP., Itami (JP); BIG DAISHOWA SEIKI CO., LTD., Higashiosaka (JP)

(72) Inventors: Naoki Matsuda, Itami (JP); Hideo Maeno, Itami (JP); Chikara Kimura, Itami (JP); Yoshihiro Kuroda, Itami (JP); Takafumi Takami, Higashiosaka (JP); Junichi Koyama, Higashiosaka (JP); Masahiro Sasano, Higashiosaka (JP)

(73) Assignees: SUMITOMO ELECTRIC HARDMETAL CORP., Itami (JP); BIG DAISHOWA SEIKI CO., LTD., Higashiosaka (JP)

( * ) Notice: Subject to any disclaimer, the term of this patent is extended or adjusted under 35 U.S.C. 154(b) by 0 days.

(21) Appl. No.: 16/957,902

(22) PCT Filed: Sep. 13, 2019

(86) PCT No.: PCT/JP2019/036128
§ 371 (c)(1),
(2) Date: Jun. 25, 2020

(87) PCT Pub. No.: WO2020/075445
PCT Pub. Date: Apr. 16, 2020

(65) Prior Publication Data
US 2020/0406368 A1 Dec. 31, 2020

(30) Foreign Application Priority Data
Oct. 11, 2018 (JP) .............................. JP2018-192619

(51) Int. Cl.
B23B 27/16 (2006.01)
B23C 5/02 (2006.01)

(52) U.S. Cl.
CPC ..... *B23B 27/1611* (2013.01); *B23B 2200/049* (2013.01); *B23C 5/02* (2013.01);
(Continued)

(58) Field of Classification Search
CPC ......... B23C 2200/0411; B23C 2200/08; B23C 2200/085; B23C 2200/125;
(Continued)

(56) References Cited

U.S. PATENT DOCUMENTS

| 5,486,073 A * | 1/1996 | Satran .................. B23C 5/2221 407/113 |
| 5,810,521 A * | 9/1998 | Pantzar ................ B23B 27/145 407/114 |
| 2007/0056413 A1 | 3/2007 | Krenzer et al. |
| 2007/0189861 A1 | 8/2007 | Muren et al. |

(Continued)

FOREIGN PATENT DOCUMENTS

| JP | H05-74708 U | 10/1993 |
| JP | 2002-263918 A | 9/2002 |

(Continued)

*Primary Examiner* — Nicole N Ramos
(74) *Attorney, Agent, or Firm* — Faegre Drinker Biddle & Reath LLP

(57) ABSTRACT

A cutting insert has a seating surface, an outer peripheral surface, a top surface, and an attachment hole. The cutting edge includes a curved cutting corner edge portion, a first cutting edge portion, and a second cutting edge portion. The top surface includes a first rake face contiguous to the first cutting edge portion, a second rake face contiguous to the second cutting edge portion, and a third rake face contiguous to the cutting corner edge portion and also contiguous to the first and second rake faces. The third rake face has a first region contiguous to the first rake face and a second region contiguous to the second rake face. The first rake face and the first region each have a rake angle which is a positive (Continued)

angle. The second rake face and the second region each have a rake angle which is a negative angle.

7 Claims, 14 Drawing Sheets

(52) U.S. Cl.
CPC ...... *B23C 2200/08* (2013.01); *B23C 2200/20* (2013.01); *B23C 2200/28* (2013.01)

(58) Field of Classification Search
CPC ........ B23C 2200/286; B23C 2200/208; B23C 2200/28; B23C 2210/503; B23C 2210/74; B23C 5/10; B23C 5/109; B23C 5/06; B23C 5/02; B23C 5/20; B23C 5/205; B23C 5/207
See application file for complete search history.

(56) References Cited

U.S. PATENT DOCUMENTS

| | | | |
|---|---|---|---|
| 2011/0008112 A1* | 1/2011 | Abe | B23C 5/109 407/42 |
| 2012/0070240 A1* | 3/2012 | Ishi | B23C 5/06 407/42 |
| 2013/0336732 A1* | 12/2013 | Jansson | B23C 5/207 407/47 |
| 2019/0047062 A1* | 2/2019 | Kiuchi | B23C 5/2208 |

FOREIGN PATENT DOCUMENTS

| | | | | |
|---|---|---|---|---|
| JP | 2007-185766 A | 7/2007 | | |
| JP | 2007-521978 A | 8/2007 | | |
| JP | 2010-64224 A | 3/2010 | | |
| JP | 4678095 B2 | 4/2011 | | |
| WO | WO-2017138170 A1 * | 8/2017 | ........... | B23C 5/2208 |

* cited by examiner

CUTTING INSERT AND BORING TOOL

TECHNICAL FIELD

The present disclosure relates to a cutting insert and a boring tool. The present application claims priority based on Japanese Patent Application No. 2018-192619 filed on Oct. 11, 2018. The entire contents described in the Japanese patent application are incorporated herein by reference.

BACKGROUND ART

Japanese Patent Laying-Open No. 2007-185766 (PTL 1) discloses a turning insert having a main clearance surface and a secondary clearance surface. According to the turning insert, the secondary clearance surface has a clearance angle larger by at least 1° than that of the main clearance surface.

CITATION LIST

Patent Literature

PTL 1: Japanese Patent Laying-open No. 2007-185766

SUMMARY OF INVENTION

A cutting insert according to the present disclosure includes a seating surface, an outer peripheral surface, a top surface, and an attachment hole. The outer peripheral surface is contiguous to the seating surface. The top surface is contiguous to the outer peripheral surface and is opposite to the seating surface with the outer peripheral surface posed therebetween. The attachment hole penetrates the cutting insert between the top surface and the seating surface. The top surface has an external shape in the form of a polygon in a top view in which the top surface is viewed in a direction perpendicular to the seating surface and extending from the top surface toward the seating surface. The top surface and the outer peripheral surface form a ridge line configuring a cutting edge. The cutting edge includes a curved cutting corner edge portion formed at one vertex of the polygon, a first cutting edge portion contiguous to one end of the cutting corner edge portion and extending linearly, and a second cutting edge portion contiguous to the other end of the cutting corner edge portion and extending linearly. The top surface includes a first rake face contiguous to the first cutting edge portion, a second rake face contiguous to the second cutting edge portion, and a third rake face contiguous to the cutting corner edge portion and also contiguous to the first and second rake faces. The third rake face has a first region contiguous to the first rake face and a second region contiguous to the second rake face. The first rake face and the first region each have a rake angle which is a positive angle. The second rake face and the second region each have a rake angle which is a negative angle.

DETAILED DESCRIPTION

Figure 1:
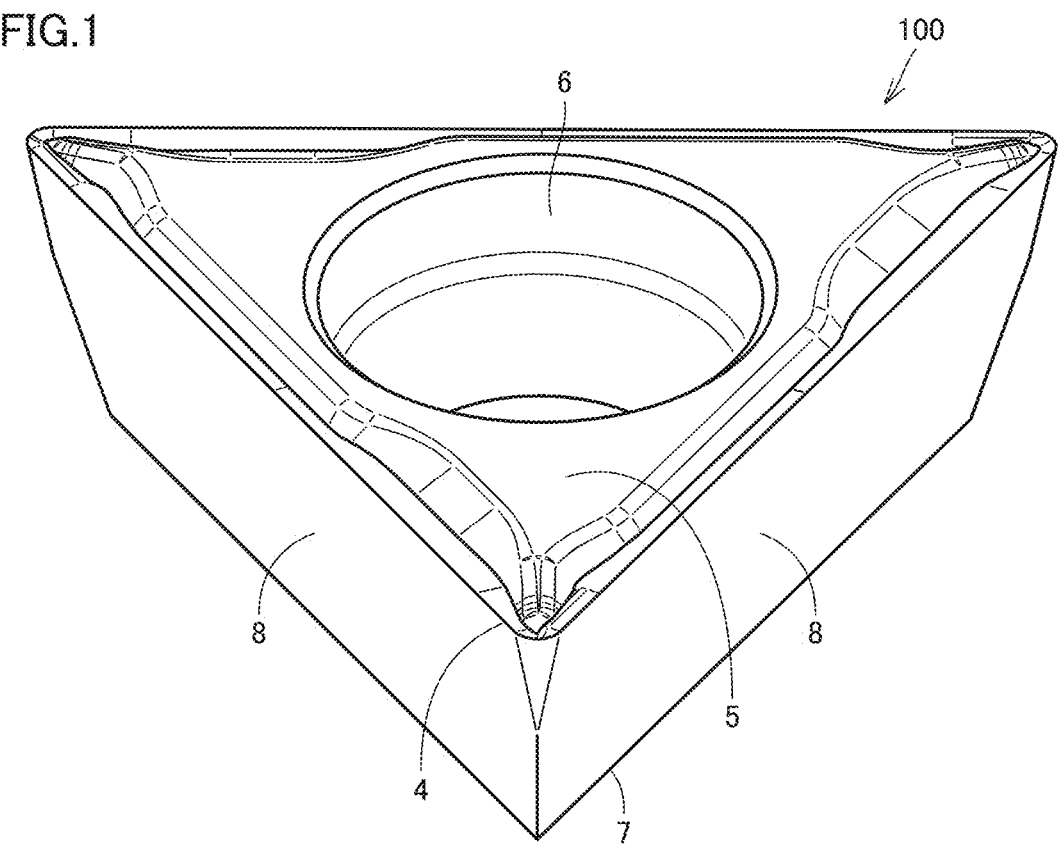
FIG. 1 is a schematic perspective view of a configuration of a cutting insert according to an embodiment.

Problem to be Solved by the Present Disclosure

When a turning insert described in Japanese Patent Application Laid-Open No. 2007-185766 is used to process a workpiece for an internal diameter, however, it is difficult to sufficiently reduce boundary wear.

It is an object of the present disclosure to provide a cutting insert and a boring tool capable of reducing boundary wear.

Advantageous Effect of the Present Disclosure

According to the present disclosure, a cutting insert and a boring tool capable of reducing boundary wear can be provided.

Overview of Embodiments of the Present Disclosure

Initially, an embodiment of the present disclosure will be outlined.

(1) A cutting insert 100 according to the present disclosure includes a seating surface 7, an outer peripheral surface 8, a top surface 5, and an attachment hole 6. Outer peripheral surface 8 is contiguous to seating surface 7. Top surface 5 is contiguous to outer peripheral surface 8 and is opposite to seating surface 7 with outer peripheral surface 8 posed therebetween. Attachment hole 6 penetrates cutting insert 100 between top surface 5 and seating surface 7. In a top view in which top surface 5 is viewed from a direction perpendicular to seating surface 7 and extending from top surface 5 toward seating surface 7, top surface 5 has an external shape in the form of a polygon. A ridge line formed by top surface 5 and outer peripheral surface 8 forms a cutting edge 4. Cutting edge 4 includes a curved cutting corner edge portion 3 formed at one vertex of the polygon, a first cutting edge portion 1 contiguous to one end of cutting corner edge portion 3 and extending linearly, and a second cutting edge portion 2 contiguous to the other end of cutting corner edge portion 3 and extending linearly. Top surface 5 includes a first rake face 10 contiguous to first cutting edge portion 1, a second rake face 20 contiguous to second cutting edge portion 2, and a third rake face 30 contiguous to cutting corner edge portion 3 and also contiguous to first and second rake faces 10 and 20. Third rake face 30 has a first region 31 contiguous to first rake face 10 and a second region 32 contiguous to second rake face 20. First rake face 10 and first region 31 each have a rake angle which is a positive angle. Second rake face 20 and second region 32 each have a rake angle which is a negative angle.

In cutting insert 100 according to the above item (1), first rake face 10 and first region 31 each have a rake angle which is a positive angle and second rake face 20 and second region 32 each have a rake angle which is a negative angle. First rake face 10 and first region 31 each having a rake angle which is a positive angle allow sharpness and chip control to be maintained satisfactorily. Second rake face 20 and second region 32 each having a rake angle which is a negative angle allow boundary wear to be reduced.

(2) In cutting insert 100 according to the above item (1), third rake face 30 may include a third region 33 contiguous to second region 32. Third region 33 may have an inclination angle which is a positive angle.

(3) In cutting insert 100 according to the above item (2), in the top view, second region 32 and third region 33 may form a ridge line connected to a boundary of first and second regions 31 and 32 of cutting corner edge portion 3.

(4) In cutting insert 100 according to any of the above items (1) to (3), first rake face 10 may have a rake angle larger than 0° and smaller than 20°.

(5) In cutting insert 100 according to any of the above items (1) to (4), second rake face 20 may have a rake angle larger than −10° and smaller than 0°.

(6) In cutting insert 100 according to any of the above items (1) to (5), in the top view, top surface 5 may have the external shape in the form of a triangle.

(7) A boring tool 200 according to the present disclosure includes cutting insert 100 of any one of the above items (1) to (6), and a holder 70 that supports cutting insert 100. Cutting insert 100 is disposed at a cutting insert attachment portion 71 provided at a front 71 of holder 70. In the top view, second cutting edge portion 2 is located along a side surface of cutting insert attachment portion 71, and first cutting edge portion 1 is located at front 71 with respect to attachment hole 6.

Details of Embodiment of the Present Disclosure

Hereinafter, an embodiment of the present disclosure will more specifically be described with reference to the drawings. In the figures, identical or equivalent components are identically denoted and will not be described repeatedly.

Figure 2:
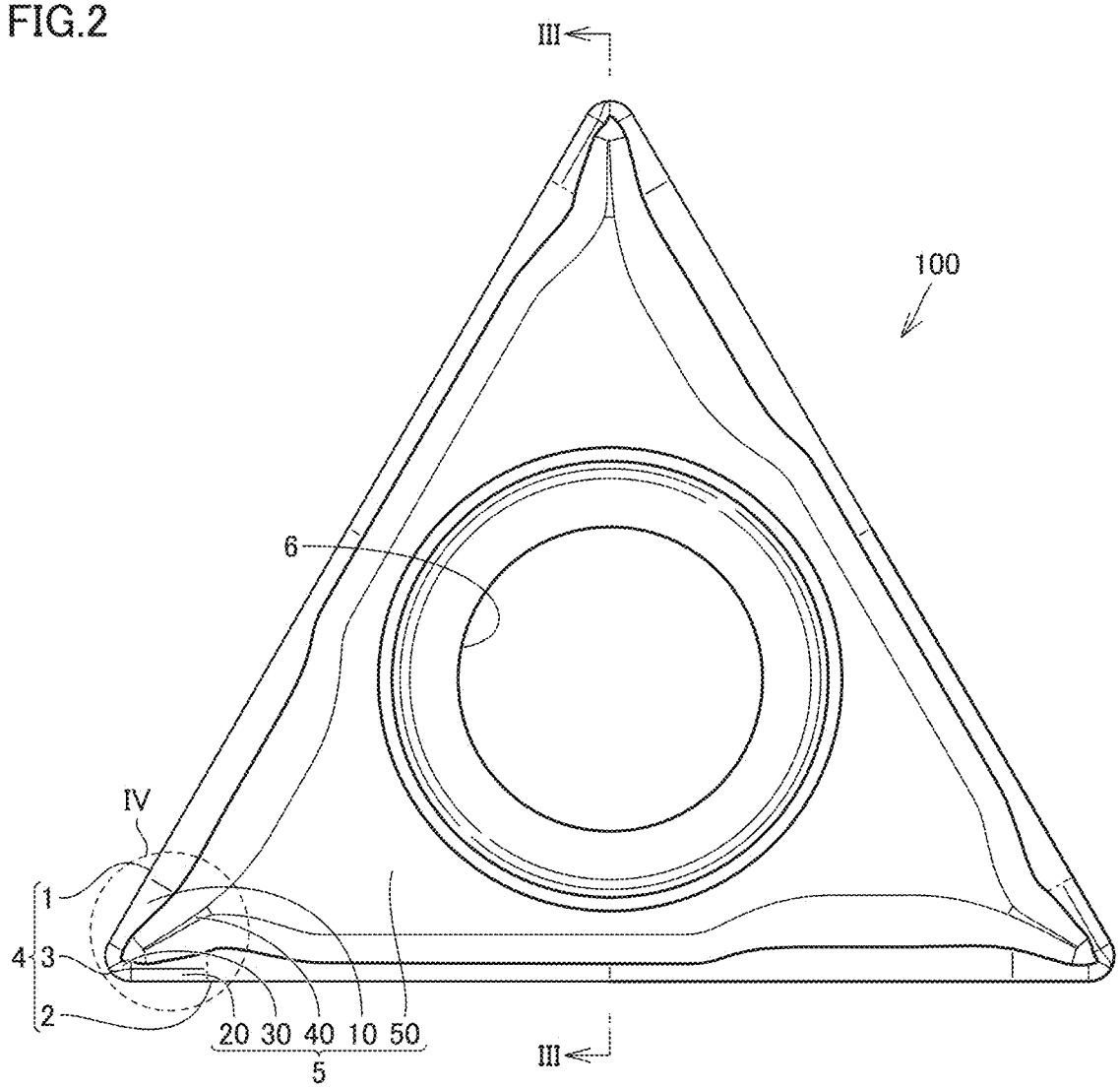
FIG. 2 is a schematic plan view of a configuration of the cutting insert according to the present embodiment.
Figure 3:
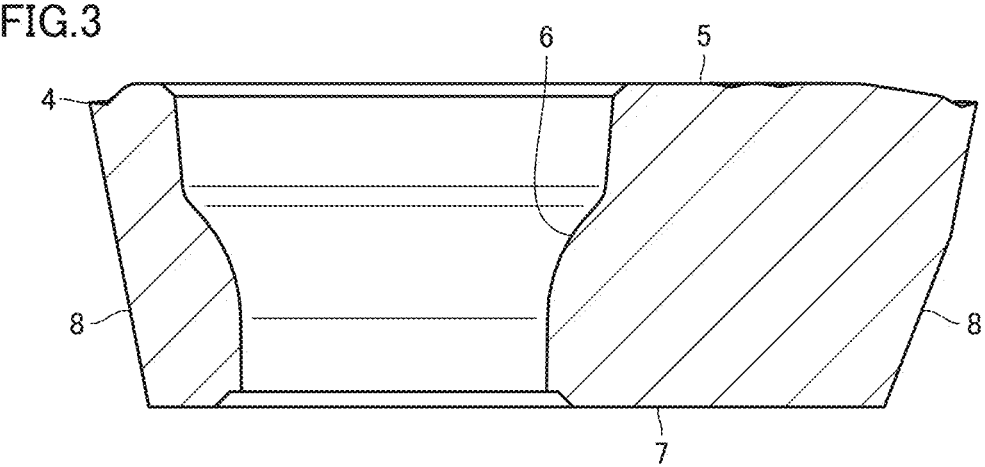
FIG. 3 is a schematic cross section taken along a line in FIG. 2.

Initially, a configuration of cutting insert 100 according to the present embodiment will be described. FIG. 1 is a schematic perspective view of a configuration of a cutting insert according to the present embodiment. FIG. 2 is a schematic plan view of a configuration of the cutting insert according to the present embodiment. FIG. 3 is a schematic cross section taken along a line in FIG. 2.

As shown in FIG. 1, cutting insert 100 according to the present embodiment mainly has a seating surface 7, an outer peripheral surface 8, a top surface 5, and an attachment hole 6. Seating surface 7 is a flat surface. Seating surface 7 is a surface on which cutting insert 100 is attached to a holder 70 (see FIG. 13). Outer peripheral surface 8 is contiguous to seating surface 7. Top surface 5 is contiguous to outer peripheral surface 8 and is opposite to seating surface 7 with outer peripheral surface 8 posed therebetween. Attachment hole 6 penetrates the cutting insert between top surface 5 and seating surface 7. Outer peripheral surface 8 surrounds attachment hole 6. In a top view in which top surface 5 is viewed in a direction perpendicular to seating surface 7 and extending from top surface 5 toward seating surface 7, top surface 5 has an external shape in the form of a polygon. In the present specification, a top view means that the direction in which top surface 5 is viewed is a direction perpendicular to seating surface 7 and extending from top surface 5 toward seating surface 7. In other words, a diagram showing a top surface of cutting insert 100 when cutting insert 100 is placed so that seating surface 7 is entirely in contact with a flat plane shows the figure of top surface 5 seen in a top view. Even when cutting insert 100 is attached to holder 70, the top view means viewing top surface 5 in the same direction. That is, it means that the direction in which top surface 5 is viewed is a direction perpendicular to seating surface 7 and extending from top surface 5 toward seating surface 7. Top surface 5 and outer peripheral surface 8 form a ridge line configuring cutting edge 4.

As shown in FIG. 2, in the top view, top surface 5 has an external shape in the form of triangle, for example. When top surface 5 has an external shape in the form of a triangle, the triangle has its three vertices used as cutting edge 4. Top surface 5 mainly has a first rake face 10, a second rake face 20, a third rake face 30, a breaker portion 40, and a flat surface 50. Flat surface 50 surrounds attachment hole 6. Note that the external shape of top surface 5 is not limited to a triangle. Top surface 5 may have an external shape in the form of a square, for example.

As shown in FIG. 3, in a cross section, outer peripheral surface 8 has a tapered shape for example. Outer peripheral surface 8 is inclined for example so that it is reduced in width from top surface 5 toward seating surface 7. Attachment hole 6 is opened through top surface 5 and seating surface 7. Attachment hole 6 is a through hole. Attachment hole 6 has a larger diameter at top surface 5 than at seating surface 7.

Figure 4:
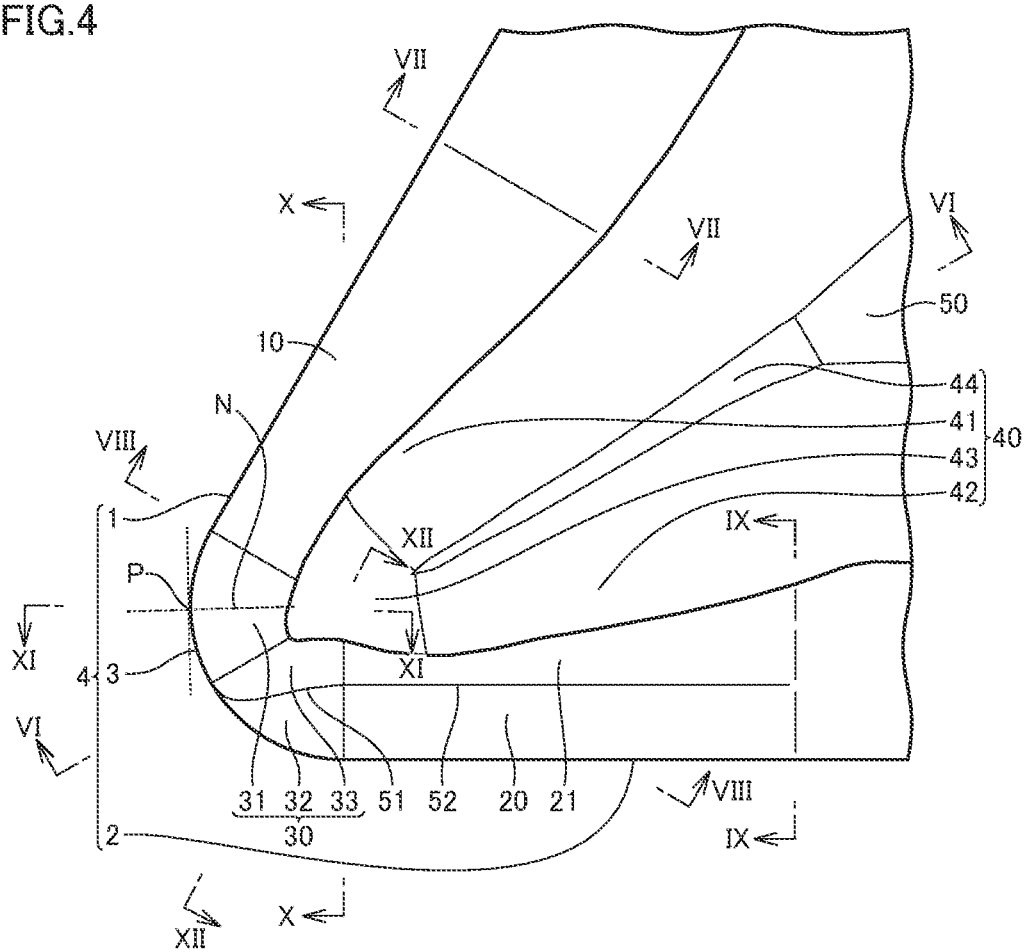
FIG. 4 is an enlarged schematic plan view of a region IV in FIG. 2.
Figure 5:
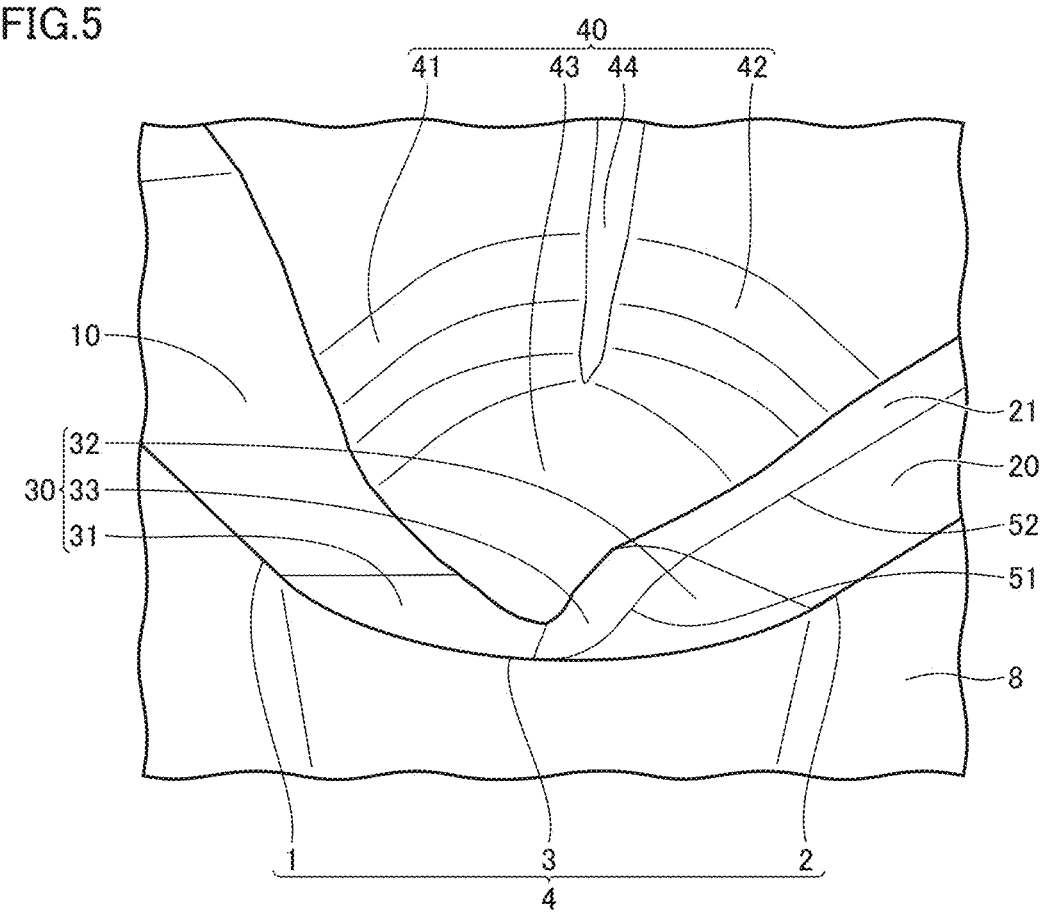
FIG. 5 is an enlarged schematic perspective view of region IV in FIG. 2.

FIG. 4 is an enlarged schematic plan view of a region IV in FIG. 2. FIG. 5 is an enlarged perspective schematic view of a region IV in FIG. 2. As shown in FIGS. 4 and 5, cutting edge 4 includes a cutting corner edge portion 3 formed at one vertex of a polygon, a first cutting edge portion 1, and a second cutting edge portion 2. First rake face 10 is contiguous to first cutting edge portion 1. Second rake face 20 is contiguous to second cutting edge portion 2. Third rake face 30 is contiguous to cutting corner edge portion 3. Third rake face 30 is contiguous to each of first rake face 10 and second rake face 20. Third rake face 30 is located between first rake face 10 and second rake face 20. Outer peripheral surface 8 and first rake face 10 form a ridge line configuring first cutting edge portion 1. Outer peripheral surface 8 and second rake face 20 form a ridge line configuring second cutting edge portion 2. Outer peripheral surface 8 and third rake face 30 form a ridge line configuring cutting corner edge portion 3. Outer peripheral surface 8 serves as a flank. It has a clearance angle for example of 11°.

As shown in FIG. 4, cutting corner edge portion 3 is curved. First cutting edge portion 1 is straight. First cutting edge portion 1 is one side of the polygon and is contiguous to one end of cutting corner edge portion 3. Second cutting edge portion 2 is straight. Second cutting edge portion 2 is another side of the polygon and is contiguous to the other end of cutting corner edge portion 3. Cutting corner edge portion 3 is located between first cutting edge portion 1 and second cutting edge portion 2.

Third rake face 30 has a first region 31, a second region 32, and a third region 33. First region 31 is contiguous to first rake face 10. Second region 32 is contiguous to second rake face 20. Third region 33 is contiguous to second region 32.

Third region 33 is located opposite to cutting corner edge portion 3 with second region 32 posed therebetween. Third region 33 is located between first region 31 and second region 32.

As shown in FIG. 4, in the top view, second region 32 and third region 33 may form a ridge line (a first ridge line) connected to a boundary of first and second regions 31 and 32 of cutting corner edge portion 3. Top surface 5 has a fifth inclined surface 21 contiguous to breaker portion 40 and second rake face 20. Fifth inclined surface 21 is located between breaker portion 40 and second rake face 20. Second rake face 20 and fifth inclined surface 21 form a ridge line (a second ridge line 52) contiguous to first ridge line 51.

As shown in FIG. 5, breaker portion 40 is a raised portion. Breaker portion 40 has a first inclined surface 41, a second inclined surface 42, a third inclined surface 43, and a fourth inclined surface 44. First inclined surface 41 is contiguous to first rake face 10. Second inclined surface 42 is contiguous to fifth inclined surface 21. Third inclined surface 43 is contiguous to first rake face 10, fifth inclined surface 21, first region 31, and third region 33. Fourth inclined surface 44 is contiguous to first inclined surface 41, second inclined surface 42, third inclined surface 43, and flat surface 50. Fourth inclined surface 44 is located between first inclined surface 41 and second inclined surface 42.

Figure 6:
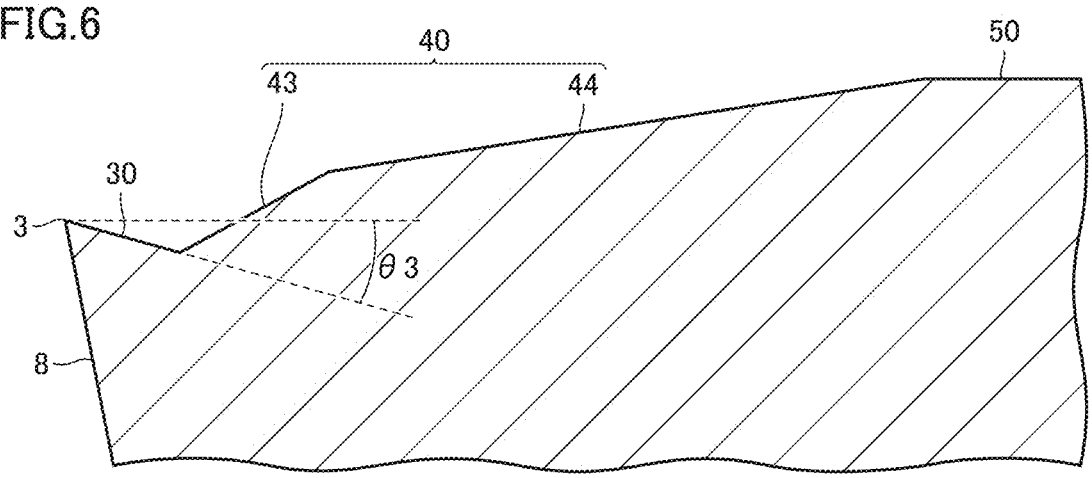
FIG. 6 is a schematic cross section taken along a line VI-VI in FIG. 4.

FIG. 6 is a schematic cross section taken along the line VI-VI in FIG. 4. The FIG. 6 cross section is a cross section which includes a straight line halving an angle formed by a straight line extending along first cutting edge portion 1 and a straight line extending along second cutting edge portion 2 and is also perpendicular to seating surface 7. In the cross section shown in FIG. 6, third rake face 30 has a rake angle (a third rake angle θ3) which is a positive angle. Third rake angle θ3 is, for example, 15°. Third rake angle θ3 may be, for example, 10° or more and 20° or less.

In the present specification, a surface having a positive angle means that the surface is inclined to have a smaller distance to seating surface 7 as the surface having the angle is farther away from cutting edge 4. In contrast, a surface having a negative angle means that the surface is inclined to have a larger distance to seating surface 7 as the surface having the angle is farther away from cutting edge 4.

An angle θ of a surface contiguous to a point P located on cutting edge 4 is defined as follows: Initially, in the top view, a normal N is determined for a specific point P on cutting edge 4. The normal N is parallel to seating surface 7. Subsequently, a cross section including the point P and the normal N and perpendicular to seating surface 7 is determined. An angle formed in the cross section by the surface contiguous to the point P and seating surface 7 is angle θ.

The sign of the angle θ, that is, whether the angle θ is a positive angle or a negative angle, is defined as follows: Initially, in the cross section, a direction parallel to seating surface 7 and extending from the point P toward breaker portion 40 is defined as X. Subsequently, when the surface contiguous to the point P is differentiated with respect to X, and the differential coefficient is negative, the angle θ of the surface is a positive angle. In contrast, when the differential coefficient is positive, the angle θ of the surface is a negative angle.

In FIGS. 6 to 12, the point P on cutting edge 4 is determined to be a single point on cutting edge 4 selected from first cutting edge portion 1, second cutting edge portion 2 or cutting corner edge portion 3. In these figures, a broken line in the horizontal direction is a part of the normal N and is also parallel to seating surface 7.

As shown in FIG. 6, third inclined surface 43 is contiguous to third rake face 30. Third inclined surface 43 is raised to have a larger distance to seating surface 7 as third inclined surface 43 is farther away from third cutting edge portion 3. Fourth inclined surface 44 is contiguous to third inclined surface 43. Third inclined surface 43 is located between third rake face 30 and fourth inclined surface 44. Fourth inclined surface 44 is contiguous to flat surface 50. Fourth inclined surface 44 is located between third inclined surface 43 and flat surface 50. Flat surface 50 and third inclined surface 43 may form an angle larger than that formed by flat surface 50 and fourth inclined surface 44. Third inclined surface 43 and fourth inclined surface 44 each have a negative inclination angle.

Figure 7:
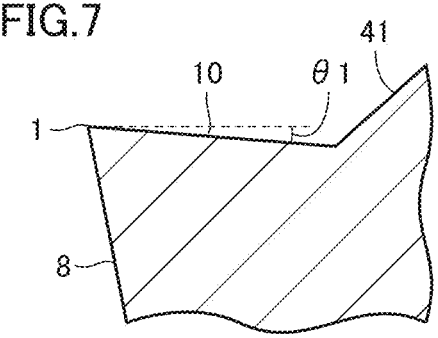
FIG. 7 is a schematic cross section taken along a line VII-VII in FIG. 4.

FIG. 7 is a schematic cross section taken along the line VII-VII of FIG. 4. The FIG. 7 cross section is a cross section perpendicular to first cutting edge portion 1, transverse to first inclined surface 41, and perpendicular to seating surface 7. In the FIG. 7 cross section, first rake face 10 has a rake angle (a first rake angle θ1) which is a positive angle. First rake angle θ1 is, for example, 5°. First rake angle θ1 may for example be larger than 0° and smaller than 20°. First rake angle θ1 may be 15° or less, and may be 10° or less. First inclined surface 41 is contiguous to first rake face 10. First inclined surface 41 is located opposite to first cutting edge portion 1 with first rake face 10 posed therebetween. First inclined surface 41 is raised to have a larger distance to seating surface 7 as first inclined surface 41 is farther away from first cutting edge portion 1. First inclined surface 41 has a negative inclination angle.

Figure 8:
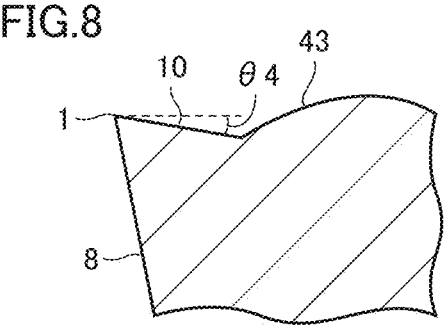
FIG. 8 is a schematic cross section taken along a line VIII-VIII in FIG. 4.

FIG. 8 is a schematic cross section taken along the line VIII-VIII in FIG. 4. The FIG. 8 cross section is a cross section perpendicular to first cutting edge portion 1, transverse to third inclined surface 43, and perpendicular to seating surface 7. In the FIG. 8 cross section, first rake face 10 has a rake angle (a fourth rake angle θ4) which is a positive angle. Fourth rake angle θ4 is, for example, 10°. Fourth rake angle θ4 may for example be larger than 0° and 15° or less. Fourth rake angle θ4 is larger than first rake angle θ1. First rake face 10 may have a portion that changes to have a rake angle increasing as first rake surface 10 approaches third rake face 30. Third inclined surface 43 is contiguous to first rake face 10. Third inclined surface 43 is located opposite to first cutting edge portion 1 with first rake face 10 posed therebetween. Third inclined surface 43 has a portion raised to have a larger distance to seating surface 7 as third inclined surface 43 is farther away from first cutting edge portion 1.

Figure 9:
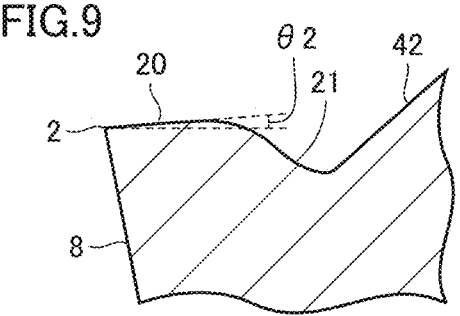
FIG. 9 is a schematic cross section taken along a line IX-IX in FIG. 4.

FIG. 9 is a schematic cross section taken along the line IX-IX of FIG. 4. The FIG. 9 cross section is a cross section perpendicular to second cutting edge portion 2, transverse to second inclined surface 42, and perpendicular to seating surface 7. In the FIG. 9 cross section, second rake face 20 has a rake angle (a second rake angle θ2) which is a negative angle. Second rake angle θ2 is, for example, −5°. Second rake angle θ2 may be larger than −10° and smaller than 0°, for example. Fifth inclined surface 21 is contiguous to second rake face 20. Fifth inclined surface 21 is located opposite to second cutting edge portion 2 with second rake face 20 posed therebetween. Fifth inclined surface 21 is inclined to have a smaller distance to seating surface 7 as fifth inclined surface 21 is farther away from second cutting edge portion 2. Second inclined surface 42 is contiguous to fifth inclined surface 21. Fifth inclined surface 21 is located between second rake face 20 and second inclined surface 42. Second inclined surface 42 is raised to have a larger distance to seating surface 7 as second inclined surface 42 is farther away from second cutting edge portion 2. Fifth inclined surface 21 has an inclination angle which is a positive angle.

Figure 10:
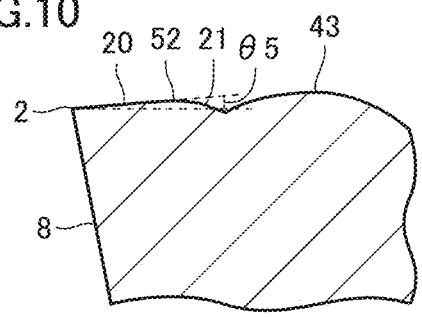
FIG. 10 is a schematic cross section taken along a line X-X in FIG. 4.

FIG. 10 is a schematic cross section taken along the line X-X in FIG. 4. The FIG. 10 cross section is a cross section perpendicular to second cutting edge portion 2, transverse to third inclined surface 43, and perpendicular to seating surface 7. In the FIG. 10 cross section, second rake face 20 has a rake angle (a fifth rake angle $\theta 5$) which is a negative angle. Fifth rake angle $\theta 5$ is, for example, $-5°$. Fifth rake angle $\theta 5$ may be larger than $-10°$ and smaller than $0°$, for example. Fifth rake angle $\theta 5$ may be equal to second rake angle $\theta 2$. Third inclined surface 43 is contiguous to fifth inclined surface 21. Fifth inclined surface 21 is located between second rake face 20 and third inclined surface 43. Third inclined surface 43 has a portion raised so that a distance between second inclined surface 42 and seating surface 7 increases as third inclined surface 43 is farther away from second cutting edge portion 2.

Figure 11:
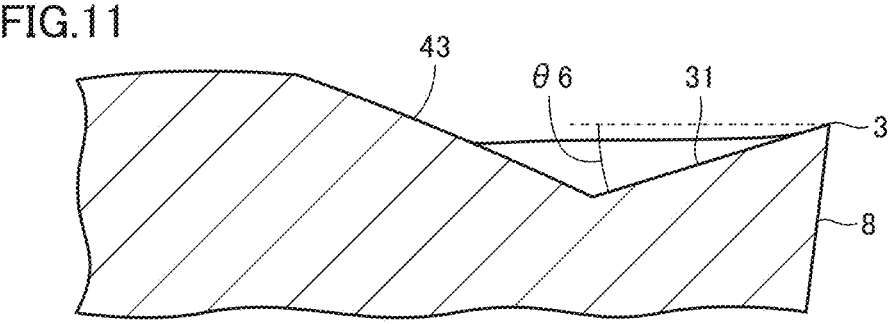
FIG. 11 is a schematic cross section taken along a line XI-XI in FIG. 4.

FIG. 11 is a schematic cross section taken along the line XI-XI in FIG. 4. The FIG. 11 cross section is a cross section transverse to first region 31 and third inclined surface 43 and perpendicular to seating surface 7. In the FIG. 11 cross section, first region 31 has a rake angle (a sixth rake angle $\theta 6$) which is a positive angle. Sixth rake angle $\theta 6$ is, for example, $17°$. Sixth rake angle $\theta 6$ may for example be $10°$ or more and $20°$ or less. Third inclined surface 43 is contiguous to first region 31. Third inclined surface 43 is located opposite to cutting corner edge portion 3 with first region 31 posed therebetween. Third inclined surface 43 is raised to have a larger distance to seating surface 7 as third inclined surface 43 is farther away from cutting corner edge portion 3. Third inclined surface 43 has an inclination angle which is a negative angle.

Figure 12:
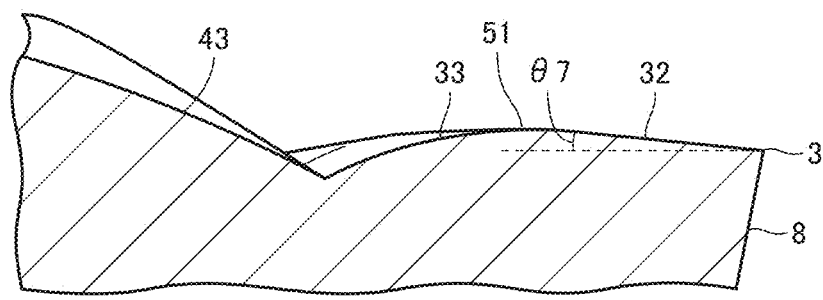
FIG. 12 is a schematic cross section taken along a line XII-XII in FIG. 4.

FIG. 12 is a schematic cross section taken along the line XII-XII in FIG. 4. The FIG. 12 cross section is a cross section transverse to second region 32, third region 33 and third inclined surface 43 and perpendicular to seating surface 7. In the FIG. 12 cross section, second region 32 has a rake angle (a seventh rake angle $\theta 7$) which is a negative angle. Seventh rake angle $\theta 7$ is, for example, $-5.4°$. Seventh rake angle $\theta 7$ may be larger than $-10°$ and smaller than $0°$, for example.

Third region 33 is contiguous to second region 32. Third region 33 is located opposite to cutting corner edge portion 3 with second region 32 posed therebetween. Third region 33 is inclined to have a smaller distance to seating surface 7 as third region 33 is farther away from cutting corner edge portion 3. In other words, third region 33 has a positive inclination angle. Third inclined surface 43 is located opposite to second region 32 with third region 33 posed therebetween. In other words, third region 33 is located between second region 32 and third inclined surface 43.

Figure 13:
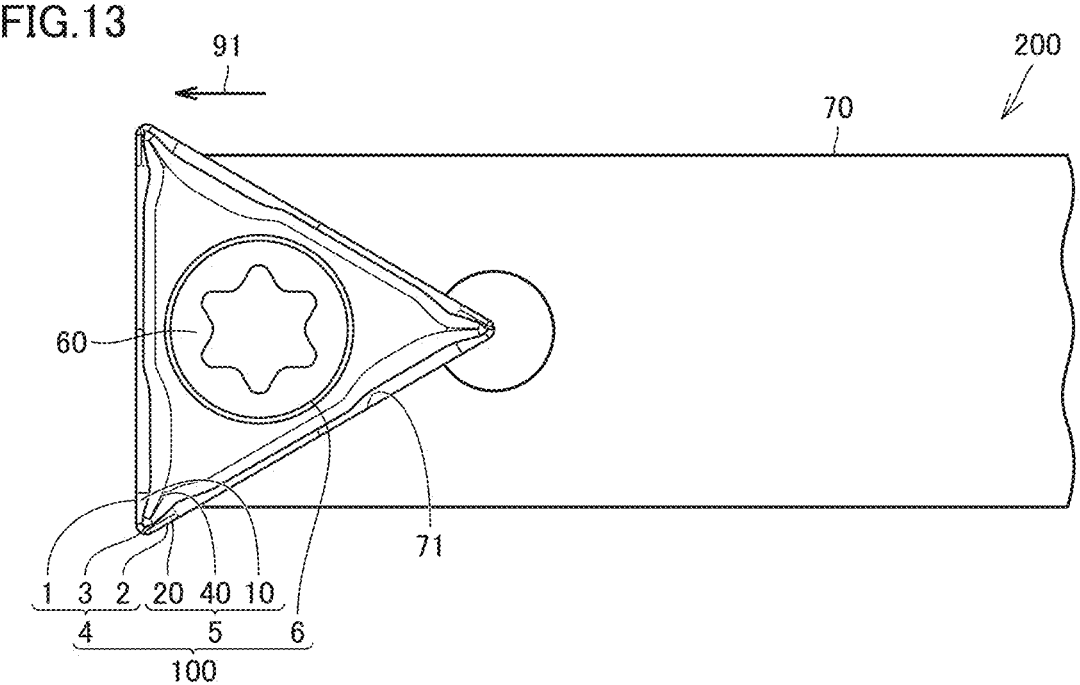
FIG. 13 is a schematic plan view of a configuration of a boring tool according to the present embodiment.

Hereinafter, a configuration of a boring tool according to the present embodiment will be described. FIG. 13 is a schematic plan view of a configuration of a boring tool according to the present embodiment.

As shown in FIG. 13, a boring tool 200 according to the present embodiment mainly includes cutting insert 100, holder 70, and a fastening screw 60. Holder 70 supports cutting insert 100. Holder 70 is provided with a cutting insert attachment portion 71. Cutting insert attachment portion 71 is a recess provided in holder 70. Cutting insert attachment portion 71 is provided at a front 91 of holder 70. Cutting insert 100 is disposed at cutting insert attachment portion 71. Fastening screw 60 is disposed in attachment hole 6 of cutting insert 100. Cutting insert 100 is fixed to holder 70 by screwing fastening screw 60 into a screw hole (not shown) provided in holder 70. As shown in FIG. 13, in the top view, second cutting edge portion 2 is provided along a side surface of cutting insert attachment portion 71. In the top view, first cutting edge portion 1 is provided at front 91 of holder 70 with respect to attachment hole 6.

Cutting insert 100 according to the present embodiment has a function and an effect as follows:

According to the present embodiment, cutting insert 100 has first rake face 10 and first region 31 each having a rake angle which is a positive angle and second rake face 20 and second region 32 each having a rake angle which is a negative angle. First rake face 10 and first region 31 each having a rake angle which is a positive angle allow sharpness and chip control to be maintained satisfactorily. Second rake face 20 and second region 32 each having a rake angle which is a negative angle allow boundary wear to be reduced.

EXAMPLES (Preparing Samples)

Initially, cutting inserts 100 according to samples 1-1, 1-2, 1-3, 2-1, 2-2, and 2-3 were prepared. Cutting inserts 100 according to the samples 1-1, 1-2, and 1-3 had first rake angle $\theta 1$ set to $5°$, second rake angle $\theta 2$ set to $-5°$, third rake angle $\theta 3$ set to $15°$, fourth rake angle $\theta 4$ set to $10°$, and fifth rake angle $\theta 5$ set to $-5°$. Cutting inserts 100 according to the samples 2-1, 2-2, and 2-3 had first rake angle $\theta 1$ set to $5°$, second rake angle $\theta 2$ set to $5°$, third rake angle $\theta 3$ set to $15°$, fourth rake angle $\theta 4$ set to $10°$, and fifth rake angle $\theta 5$ set to $10°$. That is, cutting inserts 100 according to the samples 1-1, 1-2, and 1-3 and cutting inserts 100 according to the samples 2-1, 2-2, and 2-3 differ in second rake angle $\theta 2$ and fifth rake angle $\theta 5$, and have the remainder in configuration identical to that of cutting insert 100 shown in FIG. 1.

(Evaluation Method)

A boring head set manufactured by BIG DAISHOWA SEIKI CO., LTD. (model number: EWN32-60CKB3) and a shank holder manufactured by BIG DAISHOWA SEIKI CO., LTD. (model number: BT40-CK3-135) were used as a tool. A machining center manufactured by DMG MORI. CO. LTD. (model number: NV5000/BBT40) was used as a machine. The workpiece was formed of S50C. Cutting insert 100 was formed of non-coated cermet.

Figure 14:
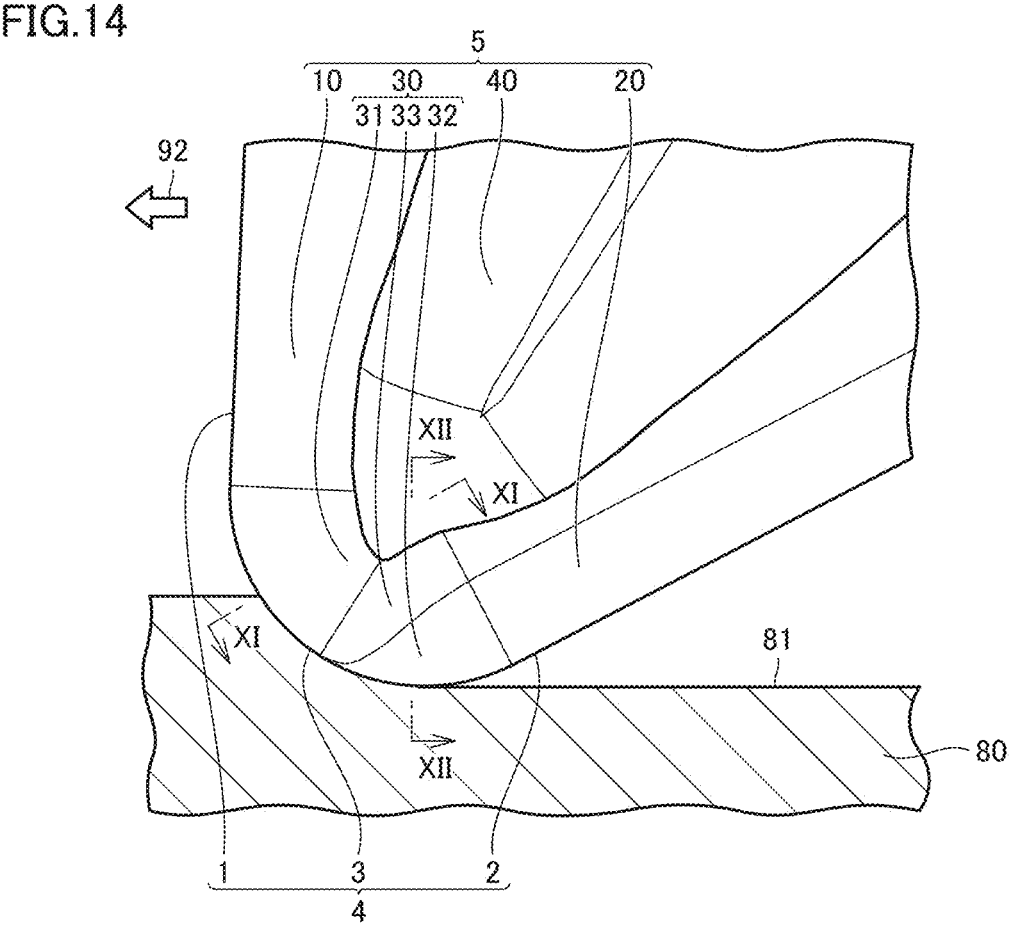
FIG. 14 is a schematic diagram showing a state in which the cutting insert is used to process a workpiece for an internal diameter.

A cutting tool having cutting inserts 100 according to the samples 1-1, 1-2, 1-3, 2-1, 2-2, and 2-3 was used to process the workpiece for an internal diameter. FIG. 14 is a schematic diagram showing a state in which cutting insert 100 is used to process the workpiece for an internal diameter. As shown in FIG. 14, while the tool was rotated, cutting insert 100 had cutting corner edge portion 3 brought into contact with a bore surface 81 of a workpiece 80 to finish bore surface 81. The cutting speed (Vc) was set to 200 m/min. The feed rate (f) was set to 0.06 mm/rotation. The cutting depth was set to 0.2 mm. A water-soluble cutting fluid was used. Internal lubrication (2 MPa) was applied. The cutting length was set to 1 m. An arrow 92 in FIG. 14 indicates a direction in which cutting insert 100 is moved. A rake angle of first region 31 in a cross section taken along the line XI-XI shown in FIG. 14 (sixth rake angle $\theta 6$) is a positive angle (see FIG. 11). A rake angle of second region 32 in a cross section taken along the line XII-XII shown in FIG. 14 (seventh rake angle $\theta 7$) is a negative angle (see FIG. 12).

(Evaluation Results)

TABLE 1

| sample Nos. | 2nd rake angle | 5th rake angle | amount of wear (mm) |
|---|---|---|---|
| sample 1-1 | −5° | −5° | −0.008 |
| sample 1-2 | | | −0.011 |
| sample 1-3 | | | −0.010 |
| sample 2-1 | 5° | 10° | −0.013 |
| sample 2-2 | | | −0.015 |
| sample 2-3 | | | −0.014 |

After a cutting tool having cutting inserts 100 according to the samples 1-1,1-2,1-3,2-1,2-2, and 2-3 was used to process the workpiece for an internal diameter, the amount of boundary wear of cutting insert 100 around second cutting edge portion 2 was measured. As shown in Table 1, cutting inserts 100 according to Samples 1-1, 1-2, and 1-3 were worn by −0.008 mm, −0.011 mm, and −0.010 mm, respectively. In contrast, cutting inserts 100 according to Samples 2-1, 2-2, and 2-3 were worn by −0.13 mm, −0.015 mm, and −0.014 mm, respectively. From the above result, it has been confirmed that second rake angle θ2 and fifth rake angle θ5 each having a negative angle can achieve a reduced amount of wear.

It should be understood that the presently disclosed embodiment and example are illustrative in any aspect and not restrictive. The scope of the present invention is defined by the terms of the claims, rather than the description above, and is intended to include any modifications within the scope and meaning equivalent to the terms of the claims.

REFERENCE SIGNS LIST 1 first cutting edge portion, 2 second cutting edge portion, 3 cutting corner edge portion, 4 cutting edge, 5 top surface, 6 attachment hole, 7 seating surface, 8 outer peripheral surface, 10 first rake face, 20 second rake face, 21 fifth inclined surface, 30 third rake face, 31 first region, 32 second region, 33 third region, 40 breaker portion, 41 first inclined surface, 42 second inclined surface, 43 third inclined surface, 44 fourth inclined surface, 50 flat surface, 51 first ridge line, 52 second ridge line, 60 fastening screw, 70 holder, 71 cutting insert attachment portion, 80 workpiece, 81 bore surface, 91 front, 92 arrow, 100 cutting insert, 200 boring tool.

The invention claimed is:

1. A cutting insert comprising:
a seating surface;
an outer peripheral surface contiguous to the seating surface;
a top surface contiguous to the outer peripheral surface and located opposite to the seating surface with the outer peripheral surface posed therebetween; and
an attachment hole penetrating the cutting insert between the top surface and the seating surface,
the top surface having an external shape in a form of a polygon in a top view in which the top surface is viewed in a direction perpendicular to the seating surface and extending from the top surface toward the seating surface,
the top surface and the outer peripheral surface forming a ridge line configuring a cutting edge,
the cutting edge including a curved cutting corner edge portion formed at one vertex of the polygon, a first cutting edge portion contiguous to a first end of the cutting corner edge portion and extending linearly, and a second cutting edge portion contiguous to a second end of the cutting corner edge portion and extending linearly,
the top surface including a first rake face contiguous to the first cutting edge portion, a second rake face contiguous to the second cutting edge portion, and a third rake face contiguous to the cutting corner edge portion and also contiguous to the first and second rake faces,
the third rake face having a first region contiguous to the first rake face and a second region contiguous to the second rake face,
the first rake face having a first rake angle which is a positive angle,
the second rake face having a second rake angle which is a negative angle,
in the top view, a normal being determined for a specific point on the cutting edge,
in a cross section including the normal and the specific point and perpendicular to the seating surface, the first region of the third rake face having a sixth rake angle which is a positive angle and the second region of the third rake face having a seventh rake angle which is a negative angle.

2. The cutting insert according to claim 1, wherein the third rake face includes a third region contiguous to the second region, and
the third region has an inclination angle which is a positive angle.

3. The cutting insert according to claim 2, wherein in the top view the second region and the third region form a ridge line connected to a boundary of the first and second regions of the cutting corner edge portion.

4. The cutting insert according to claim 1, wherein the first rake angle of the first rake face is larger than 0° and smaller than 20°.

5. The cutting insert according to claim 1, wherein the second rake angle of the second rake face is larger than −10° and smaller than 0°.

6. The cutting insert according to claim 1, wherein in the top view the top surface has the external shape in a form of a triangle.

7. A boring tool comprising a cutting insert according to claim 1 and a holder that supports the cutting insert,
the cutting insert being disposed at a cutting insert attachment portion provided at a front of the holder,
in the top view, the second cutting edge portion being located along a side surface of the cutting insert attachment portion, the first cutting edge portion being located at the front of the holder with respect to the attachment hole of the cutting insert.

* * * * *